(12) United States Patent
Okimoto et al.

(10) Patent No.: US 8,052,214 B2
(45) Date of Patent: Nov. 8, 2011

(54) SEAT STRUCTURE

(75) Inventors: Ryota Okimoto, Hiroshima (JP);
Hiroyuki Fujiwara, Hiroshima (JP);
Kenichi Kawai, Hiroshima (JP);
Etsunori Fujita, Hiroshima (JP);
Kazuyoshi Chizuka, Hiroshima (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 395 days.

(21) Appl. No.: 12/160,341

(22) PCT Filed: Jul. 28, 2006

(86) PCT No.: PCT/JP2006/314977
§ 371 (c)(1),
(2), (4) Date: Oct. 16, 2008

(87) PCT Pub. No.: WO2007/080667
PCT Pub. Date: Jul. 19, 2007

(65) Prior Publication Data
US 2010/0253122 A1      Oct. 7, 2010

(30) Foreign Application Priority Data
Jan. 10, 2006   (JP) ................................. 2006-002761

(51) Int. Cl.
*A47C 1/23*    (2006.01)
*B60N 2/02*    (2006.01)

(52) U.S. Cl. ......... 297/330; 297/273; 297/281; 297/337

(58) Field of Classification Search .................. 297/243, 297/321, 322, 317, 330, 273, 281, 282, 337
See application file for complete search history.

(56) References Cited

U.S. PATENT DOCUMENTS

| 5,269,588 | A  | * | 12/1993 | Kunz et al.     | 297/322 |
| 6,641,214 | B2 | * | 11/2003 | Veneruso        | 297/322 |
| 6,688,691 | B2 | * | 2/2004  | Marechal et al. | 297/317 |
| 6,742,840 | B2 | * | 6/2004  | Bentley         | 297/316 |
| 7,523,888 | B2 | * | 4/2009  | Ferry et al.    | 244/118.6 |

FOREIGN PATENT DOCUMENTS

| JP | 57 181638 | 11/1982 |
| JP | 1 143949  | 10/1989 |
| WO | WO 9207735 A1 * | 5/1992 |

* cited by examiner

*Primary Examiner* — David Dunn
*Assistant Examiner* — Tania Abraham
(74) *Attorney, Agent, or Firm* — Oblon, Spivak, McClelland, Maier & Neustadt, L.L.P.

(57) ABSTRACT

A seat structure capable of dealing with both a normal posture and a resting posture and providing sufficient relaxation in the resting posture while ensuring excellent comfortableness of an occupant.

According to the present invention, a back frame 20 itself is fixed to a frame support 10 but a cushion frame 30 shifts from a first position A to a second position B according to an occupant's movement and an inclination angle of a pelvis support 31 increases accordingly. The occupant's pelvis portion and a portion lower than the pelvis portion is moved forward but a part of his or her back above his or her breast is not varied. With this structure, the same effect of the resting posture, that is, the posture in which the back frame is reclined in a conventional seat structure, can be obtained. Since the back is not tilted backward, a leg room (footrest) space in a rear seat is not limited.

11 Claims, 3 Drawing Sheets

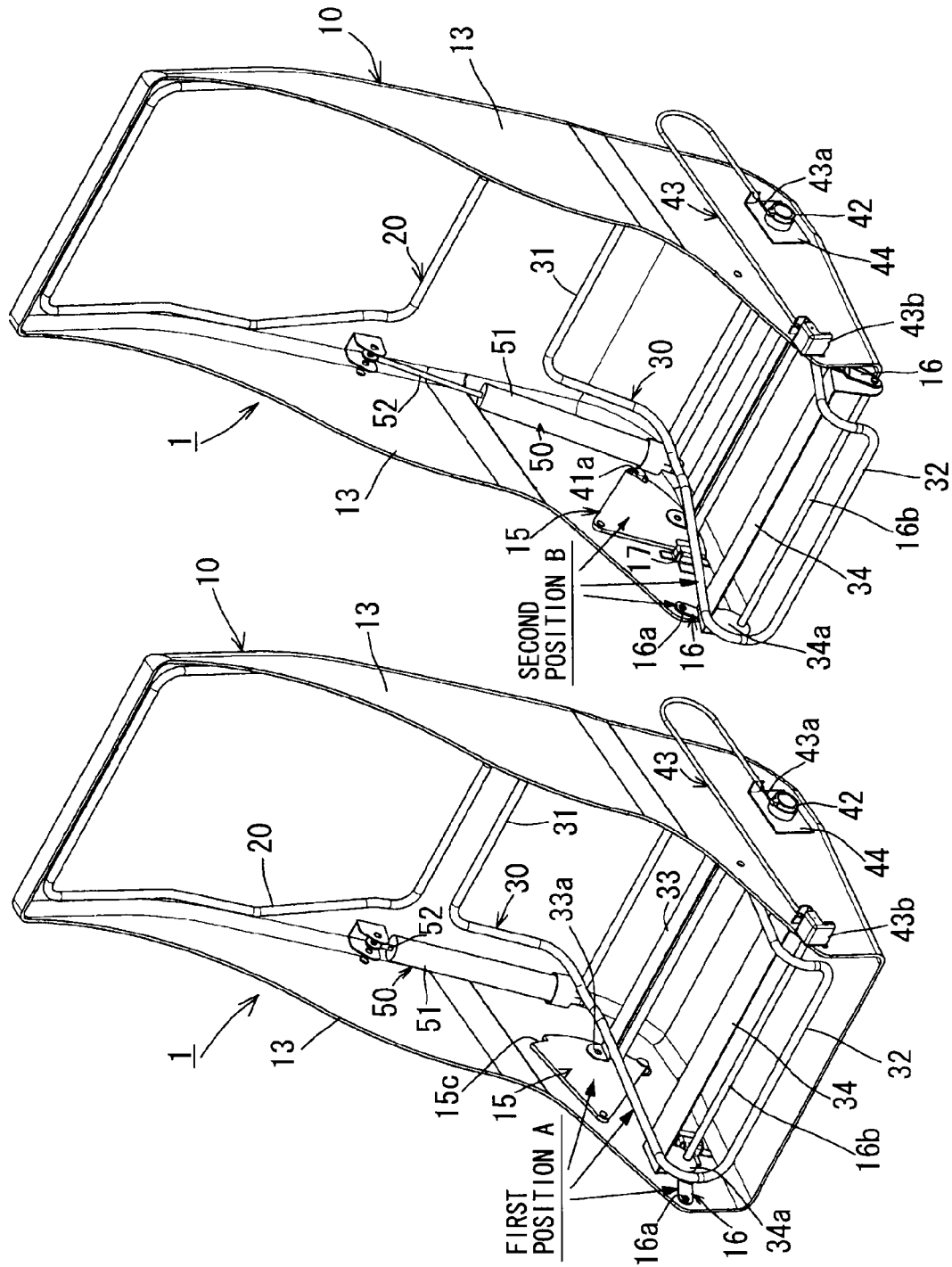

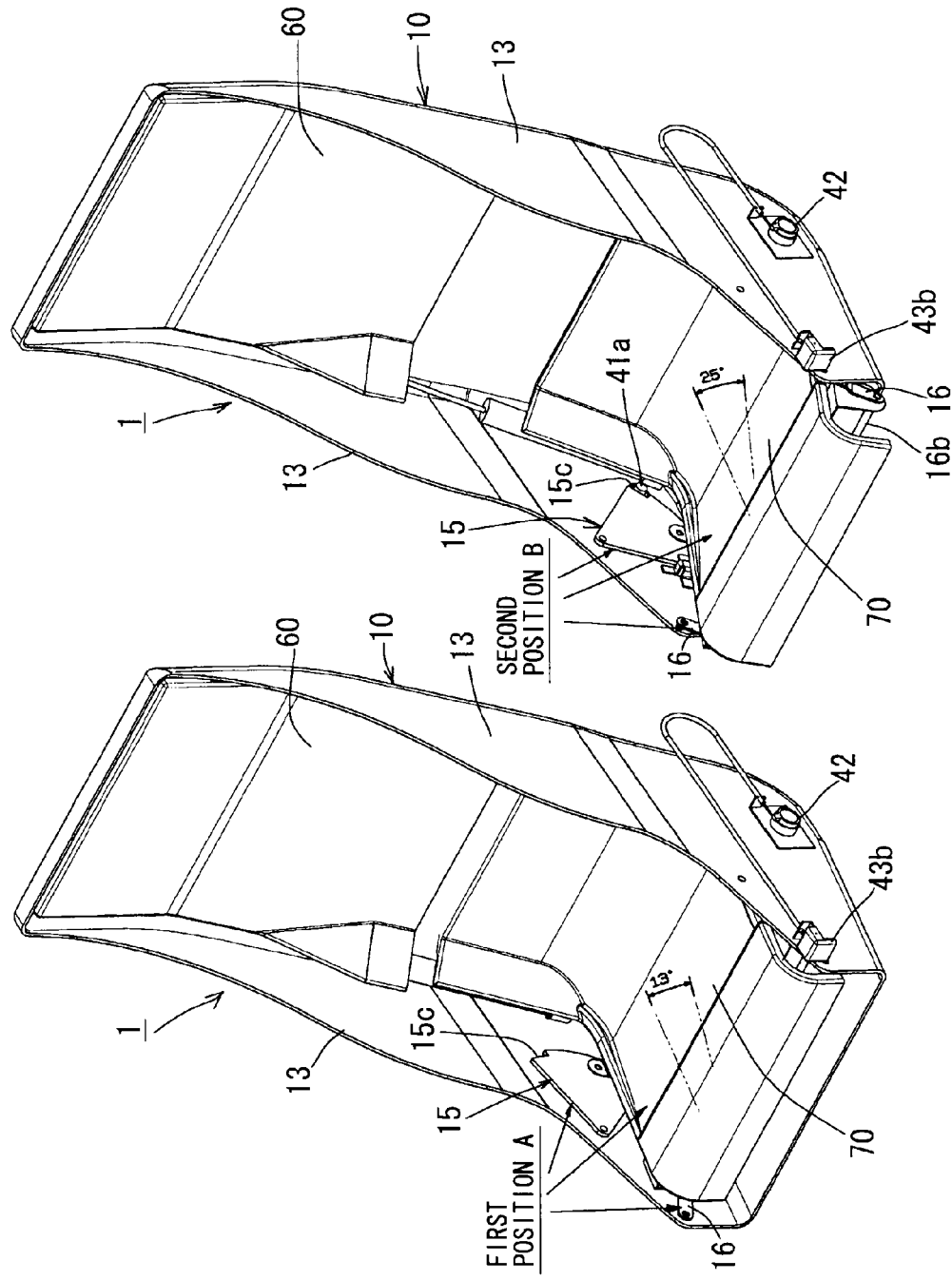

SEAT STRUCTURE

TECHNICAL FIELD

The present invention relates to a seat structure applicable to transportation devices such as aircrafts, trains, ships, forklifts and vehicles, particularly to a seat structure of aircrafts and trains in which plural seats are aligned in a longitudinal direction to provide seating space (leg room space) wider and improve the comfort of the seats.

BACKGROUND ART

In an aircraft, for example, a number of seats are continuously provided in a longitudinal direction to arrange a predetermined number of seats in a limited space. The seating space of each passenger is thus limited to be a predetermined size. In particular, there has been a problem that, when a passenger in a front seat reclines a seat backward to take a resting posture, the leg room (footrest) space of a passenger in a rear seat is significantly limited and this causes deterioration in comfort. In view of this problem, regarding such an aircraft, an effort has been required to maintain a wider seating space including the leg room (footrest) space between the front seat and the rear seat to improve passengers' comfort.

DISCLOSURE OF THE INVENTION

Problem to be Solved by the Invention

The present invention has been made in view of the above problems and has an object to provide a seat structure applicable to both a normal posture and a resting posture, in which a sufficiently relaxed resting posture is available, an excellent comfort is obtained while seated, and, even in the resting posture, it does not limit a seating space including a leg room space of a seat provided in back of the seat.

Means to Solve the Problem

In order to solve the problem, an exemplary embodiment of the present invention provides a seat structure comprising a frame support having a rear support member supporting a rear portion of a cushion frame and a front support member supporting a front portion of the cushion frame. A back frame is fixed to a back plate of the frame support so as not to be reclined. The rear support member is provided near a rear portion of a side plate of the frame support and has a portion connected to a rear portion of the cushion frame, the portion being rotatable about a rotary base between a first position that is in a relatively rear and upper position and a second position that is in a relatively front and lower position with respect to the first position. The front support member is provided near a front portion of the side plate of the frame support and has a portion connected to a front portion of the cushion frame, the portion being rotatable between a first position that is in a relatively rear and upper position and a second position that is in a relatively lower and front position with respect to the first position. A control member controls the rotation of the rear support member and the front support member so that a seating surface angle when placing both of the rear support member and the front support member in the second positions is greater than a seating surface angle when placing the rear support member and the front support member in the first positions.

In an alternative embodiment, the cushion frame has a pelvis support, at a rear end, that projects upward and disposed in back of an occupant's pelvis, and is formed in a substantially L-shape as seen from a side view. The rear support member and the front support member rotates, an inclination angle of the pelvis support of the cushion frame in the second position becomes greater than that in the first position.

In an alternative embodiment, one of the rear support member and the front support member is formed of a gear member that rotates according to a control of the control member and the other of the rear support member and the front support member is formed of a rotary member that rotates according to the rotation of the gear member.

In an alternative embodiment, the rear support member is the gear member and the front support member is the rotary member.

In an alternative embodiment, the gear member is formed in a sectoral shape with respect to the rotary base as a center and a gear tooth is formed at its arc-shaped end face. The control member comprises a pinion gear engaging with the gear tooth of the gear member and a clutch member restricting a rotation of the pinion gear. When the clutch member and the pinion gear are disconnected, the gear member and the rotary member become rotatable between the first position and the second position about the rotary base, and, when the clutch member and the pinion gear are connected, the rotation of the gear member engaged with the pinion gear stops and the cushion frame can be fixed in a preferable seating surface angle.

In an alternative embodiment, the side plate of the frame support comprises a stopper member stopping the rotation of the gear member by contacting with a front end of the gear member when the gear member is shifted from the first position to the second position.

In an alternative embodiment, the stopper member is made of an elastic member. The gear member has a cut-out portion, which is not engaged with the pinion gear, at a region corresponding to an elastically variable angle from a position that the front end of the gear member starts to contact with the stopper member. While the gear member and the rotary member are in the second position, the cushion frame is variable within the range of the elastically variable angle of the stopper member to adjust the seating surface angle.

In an alternative embodiment, the frame support comprises an elastic member applying force to return the gear member and the rotary member to the first position.

In an alternative embodiment, one end of the elastic member is fixed to an upper portion of the frame support and the other end of the elastic member is connected near the rear portion of the cushion frame.

In an alternative embodiment, the control member comprises an operation member operating to connect or disconnect the clutch member from or with the pinion gear.

In an alternative embodiment, the seating surface angle in the second position is set in a range from 22 to 28 degrees and the seating surface angle in the first position is set in a range from 12 to 15 degrees.

In an alternative embodiment, an adjustable angle of the seating surface angle in the second position using the elastic deformation of the stopper member is in a range from 1 to 4 degrees.

EFFECT OF THE INVENTION

A seat structure of the present invention has a rear support member and a front support member and rotations of the members are controlled by a control member. When the rear support member and the front support member are shifted to a second position that is in a relatively front and lower position with respect to the first position, a gap between the height of the frame rear portion and the height of the frame front portion becomes greater compared to a case of the first position. As a result, the seating surface angle of a cushioning member supported by the cushion frame becomes greater in the second position than that in the first position. Further, the inclination angle of a pelvis support of the cushion frame becomes greater in the second position than the first position. In other words, according to the present invention, the back frame itself is fixed to the frame support but the cushion frame is shifted from the first position to the second position according to an occupant's movement and the seating surface angle increases. Further, since the inclination angle of the pelvis support increases, occupant's pelvis portion and a portion lower than the pelvis portion is moved forward but a part of his or her back above his or her breast is not varied. With this structure, the same effect of the resting posture, that is, the posture in which the back frame is reclined in a conventional seat structure, can be obtained. In addition, since the position of the back frame supported by the frame support is not varied, the leg room space in a rear seat is not limited even when a resting posture is taken in a front seat within a same space as conventional.

BRIEF DESCRIPTION OF DRAWINGS

FIGS. 2A and 2B show the seat structure according to the embodiment in which a cushioning member is removed in, FIG. 2A is a diagram showing a gear member, a rotary member and a cushion frame placed in a first position, and FIG. 2B is a diagram showing the gear member, rotary member and cushion frame placed in a second position; and FIGS. 3A and 3B show the seat structure according to the embodiment in which the cushioning member is mounted, FIG. 3A is a diagram showing the gear member, rotary member and cushion frame placed in the first position, and FIG. 3B is a diagram showing the gear member, rotary member and cushion frame placed in the second position.

Figure 1:
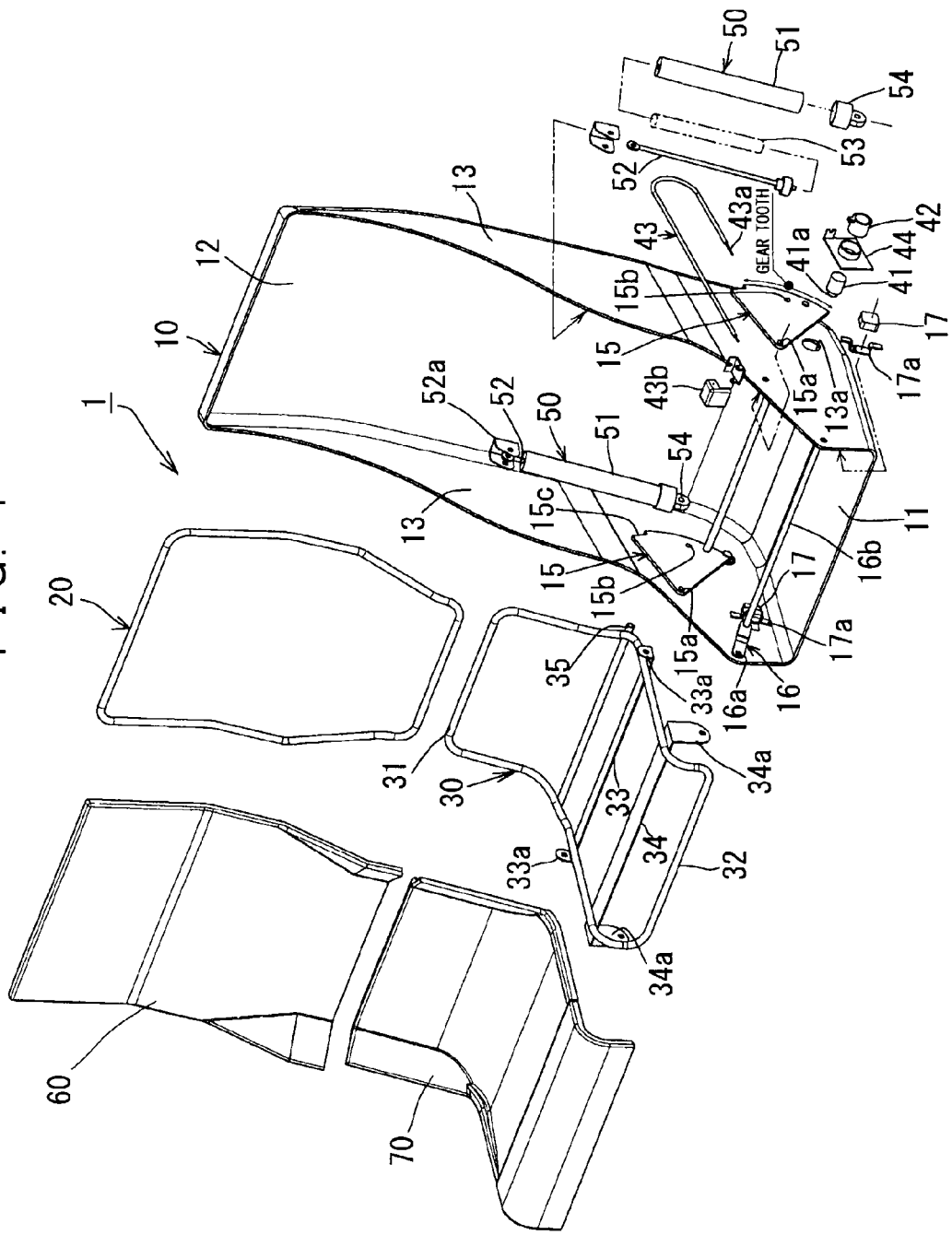
FIG. 1 is an exploded perspective view showing a seat structure according to an embodiment of the present invention.

DESCRIPTION OF THE REFERENCE NUMERALS 1 seat structure
10 frame support
13 side plate
15 gear member
15a rotary base
15c cut-out portion
16 rotary member
16a rotary base
17 stopper member
20 back frame
30 cushion frame
31 pelvis support
41 pinion gear
42 clutch member
43 operation member
50 elastic member
60, 70 cushioning member

BEST MODE FOR CARRYING OUT THE INVENTION

The present invention will be described in detail with reference to the drawings. FIG. 1 is an exploded perspective view of a seat structure 1 according to an embodiment of the present invention. As shown in FIG. 1, the seat structure 1 of the present embodiment has a frame support 10. The frame support 10 of the present embodiment has a bottom plate 11 and a back plate 12. The frame support 10 also has side plates 13 which are provided to both sides of the bottom plate 11 and back plate 12 and extend forward. The frame support 10 is configured to support a back frame 20 and movably support a cushion frame 30 as described below but the shape and structure of the frame support 10 are not limited to what is shown in FIG. 1. For example, in FIG. 1, the bottom plate 11 and the back plate 12 are integrally formed; however, they can separately be provided and one of the bottom plate 11 and the back plate 12 can be omitted if the side plates 13 are capable of supporting the back frame 20 and the like.

The back frame 20 is, for example, formed in a substantially square shape as shown in FIG. 1 and fixed to an upper portion of the back plate 12 of the frame support 10 (see FIGS. 2A and 2B). The back frame 20 can be formed in a U-shape having no bottom line for example, and the shape of the back frame 20 can be determined arbitrarily.

According to the present embodiment, the cushion frame 30 naturally has portions for supporting occupant's femoral region and haunch and further has a rear end 31 that is formed in a substantially L-shape as seen from a side view and bent to extend upward. Since the rear end 31 is bent upward, this portion is placed in back of occupant's pelvis and the function of supporting the pelvis improves. Further, according to the present embodiment, a front end 32 is also formed to slightly hang downward as seen from a side view. With this structure, backs of occupant's knees are fit to the seat in an improved function. A first supported portion (supported portion near the frame rear portion) 33 that is supported by the frame support 10 is provided at a portion which is near a rear portion of the cushion frame 30 and anterior to the rear end 31. A second supported portion (supported portion near the frame front portion) 34 that is supported by the frame support 10 is provided at a portion which is near a front portion of the cushion frame 30 and placed in back of the front end 32 and anterior to the first supported portion 33 near the frame rear portion.

The first and second supported portions 33, 34 are supported by a rear support member (gear members 15) and front support member (rotary member 16), which are respectively provided to the side plates 13 of the frame support 10. According to the present embodiment, the first and second supported portions 33, 34 are long in a width direction of the cushion frame 30 and have end faces 33a, 34a connected to the rear support member (gear members 15) and the front support member (rotary member 16) using frame members that have a U-shaped section along the width direction.

The rear support member provided to the frame support 10 has sectoral shaped gear members 15. The gear member 15 has a rotary base 15a at a center area of the fan-shape. The rotary base 15a is rotatably supported on an inner face of the side plate 13 of the frame support 10 and the gear member 15 is rotatable about the rotary base 15a. The gear members 15 are provided on the respective inner surfaces of two side plate 13 which are facing to each other and can fix respective end faces 33a of the first supported portion 33 to connection holes 15b formed near the respective arc-shaped portions of the two gear members 15. The arc-shaped end face of the gear member 15 has a gear tooth and the gear tooth and a pinion gear 41, which constitute a later described control member, are engaged to rotate. Here, at an area nearest to the rear end along the arc-shaped end face of the gear member 15, a cut-out portion 15c having no gear tooth is formed in a predetermined length. Further, stopper members 17 is provided on the respective inner surfaces of the side plates 13 to contact with the front ends of the gear members 15 when the gear members 15 rotate in a predetermined angle. The stopper member 17 is preferably made of an elastic member such as rubber. The gear member 15 rotates forward until the front end of the gear member 15 contacts with the stopper member 17. Since the pinion gear 41 is provided to be placed at the cut-out portion 15c when contacting with the stopper member 17, the position of the first supported portion 33 is variable forward and backward because of the elastic deformation amount of the stopper member 17 and the position of the second supported portion 34 is variable forward and backward accordingly. Thus, the cushion frame 30 shifts at a predetermined angle because of the elastic deformation of the stopper member 17. The variable angle can arbitrarily be set by adjusting the elasticity of the stopper member 17; however, in order to reduce user's discomfort, the angle as a seating surface angle of the cushion frame 30 is preferably set in a range from 1 to 4 degrees, more preferably 2 degrees. According to the present embodiment, the stopper member 17 is fixed to the side plate 13 using a U-shaped metallic plate member 17a and the gear member 15 can elastically deform the stopper member 17 until the gear member 15 contacts with the plate member 17a.

The front support member is formed of the thin plate-like rotary members 16 having a predetermined length. Similarly to the gear members 15, the rotary members 16 are attached to the respective inner surfaces of the pair of side plates 13 of the frame support 10 and have one end serving as the rotary bases 16a. The other end of the rotary bases 16a has a connecting shaft 16b to which the respective end faces 34a of the second supported portion 34 are connected.

The gear member 15 and rotary member 16 respectively rotate in range from a first position A (see FIG. 2A) that is in a relatively rear and upper position to a second position B (see FIG. 2B) that is in a relatively front and lower position. The posture of the cushion frame 30 supported by the gear members 15 and the rotary members 16 is also shifted between the first position A and the second position B. In other words, in a case of the first position A, a gap between the height of the frame front portion of the cushion frame 30 and the height of the frame rear portion are small and the frame front portion is slightly higher than the frame rear portion. In contrast, in a case of the second position B, the gap between the heights becomes large and the height of the frame front portion is much greater than the height of the frame rear portion. With this structure, the seating surface angle defined by the height of the frame front portion of the cushion frame 30 and the height of the frame rear portion is small in the case of the first position A and becomes large in the case of the second position B. The seating surface angle is preferably in a range from 12 to 15 degrees, more preferably 13 degrees, in the case of the first position A (see FIG. 3A) and is preferably in a range from 22 to 28 degrees, more preferably, 25 degrees, in the case of the second position B (see FIG. 3B). In order to provide such seating surface angles using the gear member 15 and the rotary member 16 to in the respective cases of the first position A and second position B, it is required to adjust the radius of gyration (the distance between the rotary base 15a and the connection hole 15b regarding the gear member 15, and the distance between the rotary base 16a and the connecting shaft 16b regarding the rotary member 16). According to the present embodiment, the height of attachment of the rotary base 16a of the rotary member 16 to the side plate 13 is lower than the height of attachment of the rotary base 15a of the gear member 15 so that the radius of gyration of the rotary member 16 is smaller than the radius of gyration of the gear member 15; however, the attachment positions of the rotary bases 15a, 16a can be adjusted in consideration of the shape of the first and second supported portions 33, 34, the sizes of the respective end face 33a, 34a and the like.

The control member for controlling an operation of the gear member 15 has a pinion gear 41, a clutch member 42 and an operation member 43. The pinion gear 41 is provided to penetrate an arrangement hole 13a formed on one of the side plate 13 (see FIG. 1) so that a gear tooth 41a of the pinion gear 41 projects inside the side plate 13 to engage with a gear tooth of one of the gear members 15 arranged inside the side plate 13. The pinion gear 41 is connected to the clutch member 42 via an attachment plate 44 in outside of the side plate 13. The clutch member 42 is operated by the operation member 43 to be connected with or disconnected from the pinion gear 41. The operation member 43 has a wire member 43a having an end connected to the clutch member 42 and an operation lever 43b connected to the wire member 43a and attached to any position of the frame support 10, that is, outside of the side plate 13 in the present embodiment. According to the operation of the operation lever 43b, the clutch member 42 is connected to the pinion gear 41 via the wire member 43a or the connection is released.

The frame support 10 also has an elastic member 50 for applying force to return the gear member 15 and the rotary member 16 to the first position A. The elastic member 50 can be made of anything if it has the above function and the attached position and structure are not limited; however, according to the present embodiment, the elastic member 50 is attached to a rear portion of the frame support 10. The elastic member 50 has a cylindrical casing 51 and a rod member 52 disposed in the casing 51, and a coil spring 53 is provided between the rod member 52 and the casing 51 and is connected to the rod member 52 and the casing 51. An end of the rod member 52 is connected to a side portion of the back frame 20, which is an upper portion of the frame support 10, via an attachment member 52a and a lid member 54 mounted to a bottom end of the casing 51 is connected to a connection frame 35 provided near a rear portion of the cushion frame 30 so that the rear portion of the cushion frame 30 is being pulled upward in a normal state.

Here, to the back frame 20 and the cushion frame 30, cushioning members 60, 70 are provided to cover their surfaces. The cushioning members 60, 70 can have any structure and an urethane member and the like can be used. The cushioning members 60, 70 are preferably made of a three-dimensional solid knitted fabric, which is thin but provides a proper cushioning characteristics when supported and stretched by the frames 20, 30 with a small tension. The three-dimensional solid knitted fabric or the urethane member can be used by laying two or more members, which are the same or different types, or can be formed with different members, which are partially provided in a planar direction and integrally sewn.

According to the seat structure 1 of the present embodiment, when the clutch member 42 and the pinion gear 41 are disconnected using the operation lever 43b in an unloaded state, the gear member 15 and the rotary member 16 are set in the first position A because of the elasticity of the coil spring 53 of the elastic member 50. When the operation lever 43b is released, the clutch member 42 and the pinion gear 41 are connected and the gear teeth of the pinion gear 41 and the gear member 15 are engaged with each other and locked. FIGS. 2A and 3A show the condition and the seating surface angle of the cushioning member 60 covering the cushion frame 30 is in 13 degrees, for example. In other words, when an occupant is seated in this condition, he or she is in an upright posture (normal posture) which is suitable for some light work.

On the other hand, when a relaxing posture (resting posture) is taken, the clutch member 42 and the pinion gear 41 are disconnected using the operation lever 43b. Then, the occupant applies force as pushing forward his or her femur and haunch. As a result, the pinion gear 41 rotates and the gear member 15 rotates from the first position A that is in a rear and upper position to the second position B that is in a front and lower position. The rotary member 16 simultaneously rotates in the same direction, accordingly. As a result, the height of the frame rear portion of the cushion frame 30 is relatively lower than the height of the frame front portion and the cushion frame 30 is shifted forward as being pushed. When the clutch member 42 and the pinion gear 41 are reconnected using the operation lever 43b, the pinion gear 41 and the gear member 15 are engaged and fixed at an arbitrary position. In contrast, when they are pushed forward, the front end of the gear member 15 rotates until contacting with the stopper member 17. FIGS. 2B and 3B show the condition that the front end of the gear member 15 contacts with the stopper member 17, that is, in the second position B. The gear tooth of the pinion gear 41 is released from the gear tooth of the gear member 15 and placed at a position corresponding to the cut-out portion 15c. As shown in FIG. 3B, for example, when the seating surface angle in which the gear member 15 starts to contact with the stopper member 17 is set to 23 degrees and the seating surface angle varies up to 2 degrees because of the elasticity of the stopper member 17, since the gear tooth of the pinion gear 41 is not engaged with the gear tooth of the gear member 15 in this condition, the seating surface angle can be varied by shifting the weight without operating the operation lever 43b, within a range of the seating surface angle, that is, from 23 to 25 degrees.

Further, when the seating surface angle of the cushion frame 30 is changed by the gear member 15 and the rotary member 16, the pelvis support 31 of the cushion frame 30 accordingly is shifted from an upright state to a reclined state.

Thus, the occupant can take a relaxing posture similarly to the case that the cushion frame 30 is fixed and the back frame 20 is reclined since the cushion frame 30 is shifted as described above even with the structure that the back frame 20 does not recline backward. With this structure, even when plural seat structures 1 of the present embodiment are provided in plural rows, leg room spaces of occupants in rear seats are fixedly maintained regardless of that the occupant in a front seat is in an upright posture (normal posture) or a relaxing posture (resting posture).

According to the above embodiment, the gear member 15 is used as a rear support member, the rotary member 16 is used as a front support member, and the control member controls the gear member formed of the rear support member using 15; however, the gear member can be used as the front support member and the rotary member can be used as the rear support member.

The invention claimed is:

1. A seat structure, comprising:
 a back frame;
 a cushion frame; and
 a frame support including a rear support member supporting a rear portion of the cushion frame and including a front support member supporting a front portion of the cushion frame,
 wherein the rear support member is provided near a rear portion of a side plate of the frame support and includes a first supported portion connected to the rear portion of the cushion frame, the rear portion of the cushion frame being rotatable about a rotary base between a first position that is in a relatively rear and upper position and a second position that is in a relatively front and lower position with respect to the first position,
 wherein the front support member is provided near a front portion of the side plate of the frame support and includes a second supported portion connected to the front portion of the cushion frame, the front portion of the cushion frame being rotatable between a first position that is in a relatively rear and upper position and a second position that is in a relatively lower and front position with respect to the first position,
 wherein a control member controls the rotation of the rear support member and the front support member so that a seating surface angle when placing both of the rear support member and the front support member in the respective second positions is greater than a seating surface angle when placing the rear support member and the front support member in the respective first positions,
 wherein the back frame is fixed to a back plate of the frame support so as not to be reclined when the cushion frame moves between the first and second positions, and
 wherein one of the rear support member and the front support member is a gear member that rotates according to a control of the control member and the other of the rear support member and the front support member is a rotary member that rotates according to the rotation of the gear member.

2. The seat structure according to claim 1, wherein the cushion frame includes a pelvis support at a rear end that projects upward and is disposed in back of an occupant's pelvis, and is formed in a substantially L-shape as seen from a side view, and
 wherein, when the rear support member and the front support member rotate, an inclination angle of the pelvis support of the cushion frame in the second position becomes greater than in the first position.

3. The seat structure according to claim 1, wherein the rear support member is the gear member and the front support member is the rotary member.

4. The seat structure according to claim 1,
 wherein the gear member has a sectoral shape with respect to the rotary base as a center and a gear tooth is formed at its arc-shaped end face,
 wherein the control member includes a pinion gear engaging with the gear tooth of the gear member and a clutch member restricting a rotation of the pinion gear, and
 wherein, when the clutch member and the pinion gear are disconnected, the gear member and the rotary member become rotatable between the first position and the second position about the rotary base, and, when the clutch member and the pinion gear are connected, the rotation of the gear member engaged with the pinion gear stops and the cushion frame is fixable in a preferable seating surface angle.

5. The seat structure according to claim 4, wherein the control member includes an operation member to connect or disconnect the clutch member from or with the pinion gear.

6. The seat structure according to claim 1, wherein the side plate of the frame support includes a stopper member stopping the rotation of the gear member by contacting a front end of the gear member when the gear member is shifted from the first position to the second position.

7. The seat structure according to claim 6, wherein the stopper member is made of an elastic member, wherein the gear member includes a cut-out portion which is not engaged with a pinion gear of the control member at a region corresponding to an elastically variable angle from a position that the front end of the gear member starts to contact the stopper member, and wherein, while the gear member and the rotary member are in the second position, the cushion frame is variable within the range of the elastically variable angle of the stopper member to adjust the seating surface angle.

8. The seat structure according to claim 7, wherein an adjustable angle of the seating surface angle in the second position using the elastic deformation of the stopper member is in a range from 1 to 4 degrees.

9. The seat structure according to claim 1, wherein the frame support includes an elastic member to return the gear member and the rotary member to the first position.

10. The seat structure according to claim 9, wherein one end of the elastic member is fixed to an upper portion of the frame support and an other end of the elastic member is connected near the rear portion of the cushion frame.

11. The seat structure according to claim 1, wherein the seating surface angle in the second position is in a range from 22 to 28 degrees and the seating surface angle in the first position is in a range from 12 to 15 degrees.

* * * * *